(12) United States Patent
Pan et al.

(10) Patent No.: US 8,749,479 B2
(45) Date of Patent: Jun. 10, 2014

(54) ELECTRONIC PAPER DISPLAY DEVICE

(75) Inventors: Chun-Wei Pan, Taipei Hsien (TW);
Kuan-Hong Hsieh, Taipei Hsien (TW);
Han-Che Wang, Taipei Hsien (TW);
Chiu-Hsiung Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 687 days.

(21) Appl. No.: 12/894,176

(22) Filed: Sep. 30, 2010

(65) Prior Publication Data

US 2011/0254869 A1  Oct. 20, 2011

(30) Foreign Application Priority Data

Apr. 16, 2010  (CN) .......................... 2010 1 0149002

(51) Int. Cl.
*G09G 3/34*  (2006.01)

(52) U.S. Cl.
USPC ......................................... 345/107; 345/105

(58) Field of Classification Search
USPC .................... 345/105, 107; 359/296
See application file for complete search history.

(56) References Cited

U.S. PATENT DOCUMENTS

| | | | | |
|---|---|---|---|---|
| 4,365,869 A | * | 12/1982 | Hareng et al. | 349/63 |
| 6,842,279 B2 | * | 1/2005 | Amundson | 359/296 |
| 7,023,418 B2 | | 4/2006 | Nakamura et al. | |
| 7,307,779 B1 | * | 12/2007 | Cernasov | 359/296 |
| 2006/0087490 A1 | * | 4/2006 | Ding et al. | 345/107 |
| 2008/0298083 A1 | * | 12/2008 | Watson et al. | 362/603 |
| 2010/0073279 A1 | * | 3/2010 | Kwon et al. | 345/107 |
| 2010/0195188 A1 | * | 8/2010 | Huang et al. | 359/296 |
| 2011/0007380 A1 | * | 1/2011 | Chen | 359/296 |
| 2011/0193790 A1 | * | 8/2011 | Lin | 345/173 |

FOREIGN PATENT DOCUMENTS

| | | |
|---|---|---|
| KR | 10-2008-0014430 A | 2/2008 |
| TW | 200612156 A | 4/2006 |
| TW | M293469 | 7/2006 |

* cited by examiner

*Primary Examiner* — Tom Sheng
(74) *Attorney, Agent, or Firm* — Novak Druce Connolly Bove + Quigg LLP

(57) ABSTRACT

An electronic paper (E-paper) display device includes a first substrate comprising at least one side wall having a high reflectance film coated thereon, an E-paper layer, and a second substrate. A light source installed beside and facing the at least one sidewall of the first substrate, the light source being configured for illuminating the E-paper layer with some of the light from the light source directly illuminating the E-paper layer and some of the light from the light source illuminating the E-paper layer via the reflection of the high reflectance film.

9 Claims, 4 Drawing Sheets

ELECTRONIC PAPER DISPLAY DEVICE

BACKGROUND

1. Technical Field

The present disclosure relates to E-paper display devices, especially to an E-paper display device with an illumination device.

2. Description of Related Art

Nowadays, electronic book readers have become more and more popular. Electronic book readers usually adopt an electronic paper (E-paper) display to display electronic book content. The E-paper display relies on reflecting ambient light to be readable. When the ambient light is weak or non-existent, the E-paper display cannot be read by users.

Therefore, what is needed is an E-paper display device with an illumination device alleviating the limitations described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure, including the accompanying, is illustrated by way of example and not by way of limitation. It should be noted that references to "an" or "one" embodiment in this disclosure are not necessarily to the same embodiment, and such references mean at least one.

Figure 1:
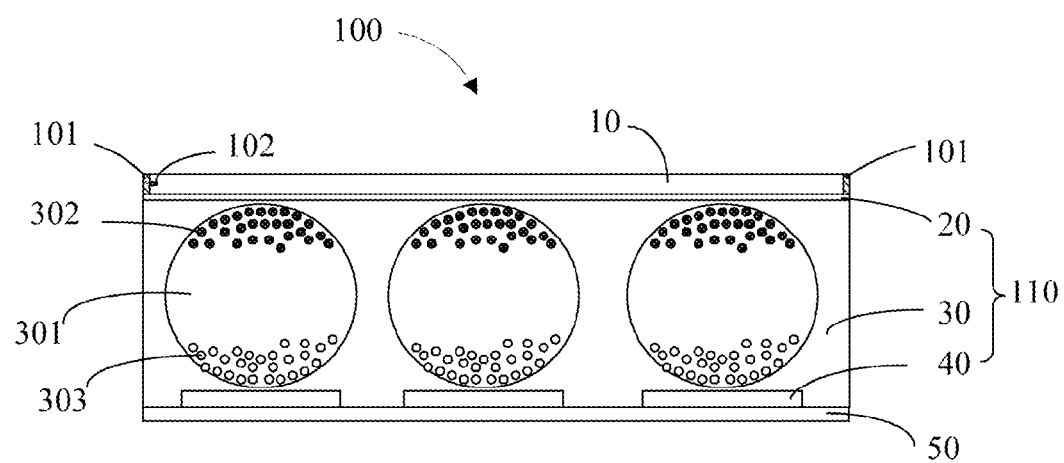
FIG. 1 is a schematic, cross-sectional view showing an electronic paper (E-paper) display device in accordance with an exemplary embodiment.

Referring to FIG. 1, an electronic paper (E-paper) display device 100 includes a first substrate 10, an E-paper layer 110, a second substrate 50, a power unit (not shown), and a driving circuit (not shown). The E-paper layer 110 is arranged between the first substrate 10 and the second substrate 40. The E-paper layer 110 includes a common electrode 20, an electrophoretic medium layer 30, and a pixel electrode 40.

The first substrate 10 is transparent and may be made of plastic or glass, such as polymethyl methacrylate (PMMA). The common electrode 20 is formed between the first substrate 10 and the electrophoretic medium layer 30, which corresponds to a display area of the first substrate 10. The common electrode 20 can be made of indium tin oxide (ITO). The pixel electrode 40 is formed between the second substrate 50 and the electrophoretic medium layer 30. The pixel electrode 40 includes a plurality of thin film transistor (TFT) electrodes.

The electrophoretic medium layer 30 may be an encapsulated electrophoretic medium. The electrophoretic medium layer 30 includes a plurality of microcapsules 301, each of which comprises a capsule wall containing suspension fluid in which a plurality of first charged particles 302 and a plurality of second charged particles 303 are suspended. The first charged particles 302 and the second charged particles 303 are provided with different optical and electrical properties. Upon application of an electrical field between the common electrode 20 and the pixel electrode 40, the first charged particles or the second charged particles move to the common electrode 20 to form images on the E-paper display device 100.

Figure 2:
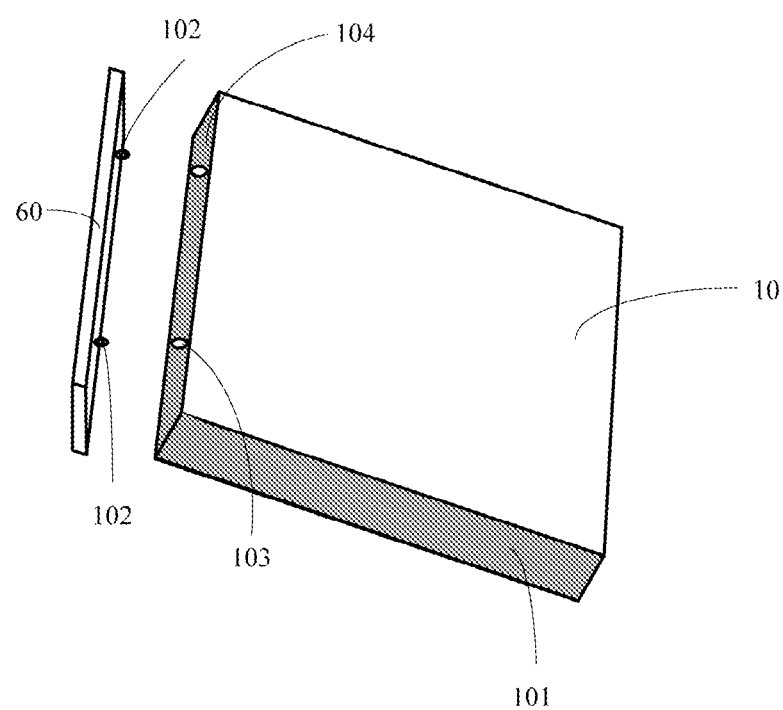
FIG. 2 is a schematic, isometric view showing a first substrate of the E-paper display device in FIG. 1.
Figure 3:
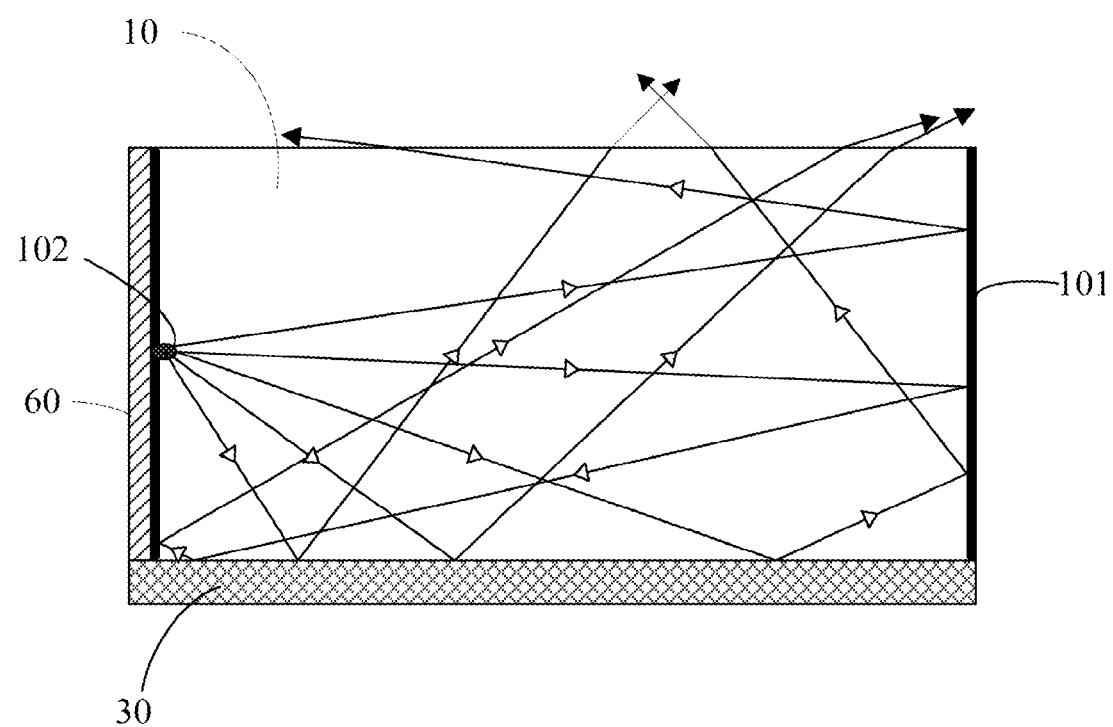
FIG. 3 is a schematic, cross-sectional view showing light paths in the first substrate of the E-paper display device in FIG. 1.

Referring to FIGS. 2 and 3, a light source is installed beside the first substrate 10, specifically, the light source is installed beside and facing at least one side wall of the first substrate 10. In the embodiment, the light source includes a plurality of light emitting diodes (LEDs) 102 which are installed on a printed circuit board (PCB) 60, and connected to the power unit. The first substrate 10 includes a plurality of concavities 103 formed in the surface of a sidewall 104. A high reflectance film 101 is coated on each sidewall of the first substrate 10, but not in the concavities 103. The light source is installed beside and facing the sidewall 104 of the first substrate 10, and the LEDs 102 are accommodated in the concavities 103.

Referring to FIG. 3, some of the light beams from the LEDs 102 reach the E-paper layer 110 directly, while some of the light beams from the LEDs 102 are reflected multiple times by the high reflectance film 101 and ultimately reach the E-paper layer 110, the E-paper layer 110 is thus illuminated homogeneously. When the ambient light is weak or there is no ambient light, the LEDs 102 can be turned on to keep the content displayed by the E-paper layer visible.

The LEDs 102 are tilted about 5 to 25 degrees relative to the E-paper layer 110, so that most of the light beams from the LEDs 102 directly travel to the E-paper layer 110, and the rest of the light beams from the LEDs 102 are reflected by the high reflectance film 101 and then reach the E-paper layer 110, so that the E-paper layer 110 can be illuminated more homogeneously.

Figure 4:
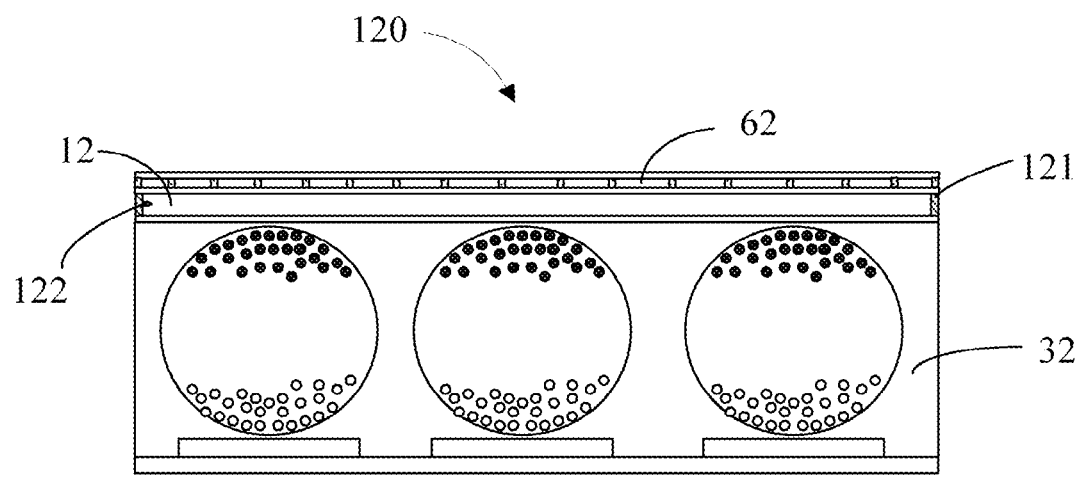
FIG. 4 is a schematic, cross-sectional view showing an E-paper display device in accordance with another embodiment.

FIG. 4 shows an E-paper display device 120 of another embodiment. The E-paper display device 120 is similar to the E-paper display device 100 that is described above. The E-paper display device 120 includes a first substrate 12, an electrophoretic medium layer 32, and at least one LED 122, a high reflectance film 121. The difference between the E-paper display devices 120 and 100 is that the E-paper display device 120 further includes a touch layer 62 attached on the first substrates 12. The touch layer 62 may be a resistive touch layer with high light transmittance, which is made of two ITO layers spaced by a plurality of transparent insulator. In an alternative embodiment, the touch layer 62 can be a capacitive touch layer with high light transmittance.

Some of the light beams from the LEDs 122 are reflected multiple times by the high reflectance film 121, and then the reflected light is diffused by the electrophoretic medium layer 32, passes though the first substrate 12 and the touch layer 62, content displayed by the display device 120 remains visible even in darkness.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic paper (E-paper) display device comprising:
- a first substrate comprising at least one side wall having a high reflectance film coated thereon;
- a second substrate;
- an E-paper layer between the first and the second substrates;
- a light source installed beside and facing the at least one sidewall of the first substrate, the light source being configured for illuminating the E-paper layer with some of the light from the light source directly illuminating the E-paper layer and some of the light from the light source illuminating the E-paper layer via the reflection of the high reflectance film; and
- wherein the light source comprises a printed circuit board and a plurality of light emitting diodes (LEDs) installed on the printed circuit board, the plurality of LEDs are installed within the E-paper layer and tilts about 5 to about 25 degrees relative to the E-paper layer.

2. The E-paper display device of claim 1, wherein the first substrate comprises a plurality of concavities holes formed on the side wall of the first substrate, the LEDs are accommodated in the concavities.

3. The E-paper display device of claim 2, wherein the high reflectance film is coated on each sidewall of the first substrate, but not in the concavities.

4. The E-paper display device of claim 1, wherein the E-paper layer comprises a common electrode, an electrophoretic medium layer, and a pixel electrode.

5. The E-paper display device of claim 4, wherein the electrophoretic medium layer is an encapsulated electrophoretic medium.

6. The E-paper display device of claim 1, wherein the first substrate is made of glass or plastic.

7. The E-paper display device of claim 1, further comprising a touch layer attached on the first substrates.

8. The E-paper display device of claim 7, wherein the touch layer is a resistive touch layer.

9. The E-paper display device of claim 7, wherein the touch layer is a capacitive touch layer.

* * * * *